US011099306B2

(12) United States Patent
De Lamberterie et al.

(10) Patent No.: US 11,099,306 B2
(45) Date of Patent: Aug. 24, 2021

(54) FRESNEL LENS WITH VARIABLE DRAFT ANGLE

(71) Applicant: VALEO VISION, Bobigny (FR)

(72) Inventors: Antoine De Lamberterie, Bobigny (FR); Samira Mbata, Bobigny (FR); Nicolas Lefaudeux, Bobigny (FR); Thomas Canonne, Bobigny (FR); Van-Thai Hoang, Bobigny (FR); Vincent Dubois, Bobigny (FR); Francois-Xavier Amiel, Bobigny (FR)

(73) Assignee: VALEO VISION, Bobigny (FR)

(*) Notice: Subject to any disclaimer, the term of this patent is extended or adjusted under 35 U.S.C. 154(b) by 126 days.

(21) Appl. No.: 16/127,825

(22) Filed: Sep. 11, 2018

(65) Prior Publication Data
US 2019/0079217 A1    Mar. 14, 2019

(30) Foreign Application Priority Data

Sep. 11, 2017  (FR) ...................... 17 58363

(51) Int. Cl.
| G02B 3/08 | (2006.01) |
| F21V 5/04 | (2006.01) |
| F21S 41/275 | (2018.01) |
| F21S 41/255 | (2018.01) |
| G02B 5/18 | (2006.01) |
| G02B 5/04 | (2006.01) |

(52) U.S. Cl.
CPC .............. *G02B 3/08* (2013.01); *F21S 41/255* (2018.01); *F21S 41/275* (2018.01); *F21V 5/045* (2013.01); *G02B 5/1814* (2013.01); *G02B 5/1876* (2013.01); *G02B 5/04* (2013.01)

(58) Field of Classification Search
CPC ...... G02B 3/08; G02B 5/1876; G02B 5/1814; F24J 2/085; Y02E 10/43; B29D 11/00269; F21S 41/275
See application file for complete search history.

(56) References Cited

U.S. PATENT DOCUMENTS

| 659,353 A | 10/1900 | Pitkin |
| 4,238,817 A | 12/1980 | Fratty |
| 5,160,192 A * | 11/1992 | Sugawara ................. F21V 7/08 |
| | | 362/16 |

(Continued)

FOREIGN PATENT DOCUMENTS

| CN | 101750644 A | 6/2010 |
| FR | 2 867 835 A1 | 9/2005 |
| GB | 2523346 | 8/2015 |

OTHER PUBLICATIONS

French Preliminary Search Report dated May 3, 2018 in French Application 17 58363 filed on Sep. 11, 2017 (with English Translation of Categories of Cited Documents).

(Continued)

*Primary Examiner* — Alicia M Harrington
(74) *Attorney, Agent, or Firm* — Oblon, McClelland, Maier & Neustadt, L.L.P.

(57) ABSTRACT

A Fresnel lens with Fresnel prisms having a first facet, called the main facet, and a second facet, called the draft facet, the draft facet making a draft angle to the optical axis, the draft angle being variable along at least one Fresnel prism, so that the draft angle is higher on one side of the lens than on the other.

3 Claims, 5 Drawing Sheets

(56) References Cited

U.S. PATENT DOCUMENTS

| | | | |
|---|---|---|---|
| 9,810,904 B1* | 11/2017 | Bierhuizen | .......... H04N 13/344 |
| 2005/0041307 A1 | 2/2005 | Barone | |
| 2018/0074323 A1* | 3/2018 | Wheelwright | ........... G02B 3/08 |

OTHER PUBLICATIONS

Combined Chinese Office Action and Search Report dated Mar. 31, 2020, in Patent Application No. 201811059209.X, 12 pages (with unedited computer generated English translation).

* cited by examiner

| θ\i | 1 | 10 | 20 | 30 | 40 | 50 | 60 | 70 | 72 |
|---|---|---|---|---|---|---|---|---|---|
| -90 | 10,48 | 12,95 | 15,64 | 18,26 | 20,81 | 23,27 | 25,64 | 27,92 | 28,37 |
| -80 | 10,33 | 12,80 | 15,50 | 18,12 | 20,67 | 23,14 | 25,51 | 27,80 | 28,25 |
| -70 | 9,88 | 12,36 | 15,06 | 17,70 | 20,26 | 22,74 | 25,13 | 27,44 | 27,89 |
| -68 | 9,75 | 12,24 | 14,94 | 17,58 | 20,15 | 22,63 | 25,03 | 27,33 | 27,78 |
| -60 | 9,14 | 11,63 | 14,35 | 17,01 | 19,59 | 22,09 | 24,51 | 26,83 | 27,29 |
| -50 | 8,13 | 10,64 | 13,38 | 16,06 | 18,67 | 21,20 | 23,65 | 26,01 | 26,47 |
| -45 | 7,54 | 10,05 | 12,80 | 15,50 | 18,12 | 20,67 | 23,14 | 25,51 | 25,98 |
| -40 | 6,88 | 9,41 | 12,17 | 14,88 | 17,52 | 20,09 | 22,57 | 24,97 | 25,44 |
| -30 | 5,43 | 7,97 | 10,76 | 13,50 | 16,17 | 18,78 | 21,31 | 23,75 | 24,23 |
| -23 | 4,31 | 6,86 | 9,67 | 12,43 | 15,13 | 17,76 | 20,32 | 22,80 | 23,28 |
| -20 | 3,81 | 6,37 | 9,18 | 11,95 | 14,66 | 17,31 | 19,88 | 22,37 | 22,86 |
| -10 | 2,08 | 4,65 | 7,48 | 10,27 | 13,02 | 15,71 | 18,33 | 20,87 | 21,37 |
| -5 | 1,19 | 3,76 | 6,60 | 9,41 | 12,17 | 14,88 | 17,52 | 20,09 | 20,59 |
| 0 | 0,30 | 2,86 | 5,71 | 8,53 | 11,50 | 14,55 | 17,47 | 20,17 | 20,67 |
| 5 | 0,30 | 1,97 | 4,82 | 7,65 | 11,33 | 15,79 | 19,93 | 23,07 | 23,54 |
| 10 | 0,30 | 1,07 | 3,93 | 6,77 | 11,37 | 18,20 | 24,70 | 28,51 | 28,83 |
| 15 | 0,30 | 0,30 | 3,06 | 5,90 | 11,07 | 19,71 | 28,30 | 32,55 | 32,69 |
| 23 | 0,30 | 0,30 | 1,70 | 4,56 | 9,36 | 16,80 | 24,02 | 28,06 | 28,35 |
| 30 | 0,30 | 0,30 | 0,57 | 3,43 | 7,36 | 12,38 | 17,09 | 20,52 | 20,99 |
| 40 | 0,30 | 0,30 | 0,30 | 1,96 | 4,92 | 7,92 | 10,86 | 13,66 | 14,20 |
| 45 | 0,30 | 0,30 | 0,30 | 1,30 | 4,16 | 7,00 | 9,80 | 12,56 | 13,10 |
| 50 | 0,30 | 0,30 | 0,30 | 0,69 | 3,55 | 6,40 | 9,21 | 11,98 | 12,52 |
| 60 | 0,30 | 0,30 | 0,30 | 0,30 | 2,53 | 5,38 | 8,20 | 10,99 | 11,54 |
| 68 | 0,30 | 0,30 | 0,30 | 0,30 | 1,90 | 4,75 | 7,58 | 10,38 | 10,93 |
| 70 | 0,30 | 0,30 | 0,30 | 0,30 | 1,77 | 4,62 | 7,46 | 10,25 | 10,81 |
| 80 | 0,30 | 0,30 | 0,30 | 0,30 | 1,30 | 4,16 | 7,00 | 9,80 | 10,36 |
| 90 | 0,30 | 0,30 | 0,30 | 0,30 | 1,15 | 4,00 | 6,84 | 9,65 | 10,20 |

Fig. 8

FRESNEL LENS WITH VARIABLE DRAFT ANGLE

TECHNICAL FIELD

The present invention relates to the field of Fresnel lenses and of lighting devices comprising such lenses.

BACKGROUND

Fresnel lenses allow lenses that are less thick than highly convex lenses but that have the same properties with respect to deviating light rays to be produced. Fresnel lenses include a succession of Fresnel prisms, this succession being laid out in a direction extending from the centre of the lens to one edge thereof.

Document FR2799153 discloses a Fresnel lens. Each Fresnel lens has a first facet, which is turned toward the exterior of the lens, and a second facet, called the draft facet, which is turned toward the centre of the lens. The dioptric interfaces formed by the first facets together form the equivalent of the dioptric interface of an exit face of a convergent lens. In Fresnel lenses, the draft facets allow the thickness of the lens to be decreased by shifting the first facets toward the back face of the lens in a direction parallel to the optical axis of the lens.

Although it is the first facets that essentially have an optical utility, certain rays may encounter the draft facets and then be inappropriately deviated thereby.

To decrease this risk, document FR2799153 proposes to arrange the draft facets so that rays issued from the focal point of the lens, after a first refraction by the entrance face, propagate in the lens parallel to these draft facets.

However, although their number is decreased, it turns out that parasitic rays liable to degrade the photometry of a beam obtained with such a lens are still produced.

The technical problem that the invention aims to solve is therefore that of improving a light beam obtained with a Fresnel lens.

SUMMARY

To this end, a first subject of the invention is a Fresnel lens having an optical axis and comprising Fresnel prisms, each Fresnel prism having a first facet, called the main facet, and a second facet, called the draft facet, the draft facet making a draft angle to the optical axis. In this lens, for at least one of the Fresnel prisms, the draft angle is variable along this Fresnel prism, so that the draft angle is higher on a first side of the lens than on a second side of the lens that is substantially opposite said first side.

Thus, on the second side the draft facet bends the parasitic rays toward the zone receiving the parasitic rays originating from the draft facet on the first side. Thus, the Fresnel lens orients parasitic rays into a zone that receives both the parasitic rays originating from the first side of the lens and the parasitic rays originating from the second side of the lens, this zone forming the reception zone of the parasitic rays.

The lens according to the invention may then be arranged in a vehicle's lighting device so that this reception zone is in a location requiring greater lighting and/or in which it is less bothersome.

BRIEF DESCRIPTION OF THE DRAWINGS

By side of the lens, what is meant is a zone located on the side of the optical axis, and therefore extending between the optical axis and the peripheral edge of the lens.

The lens according to the invention may optionally comprise one or more of the following features:
  most of the Fresnel prisms are variable-draft-angle Fresnel prisms; thus, over the entire circumference of the lens, more parasitic rays deviated by the draft facets are steered toward the reception zone; in particular, at least 75%, for example at least 90%, or even 100%, of the Fresnel prisms are variable-draft-angle Fresnel prisms;
  the lens is intended to be oriented, in a vehicle, with the first side at the bottom and the second side at the top; thus, the parasitic rays are steered downward, where they will not dazzle the drivers of oncoming vehicles or of vehicles that are being followed;
  the draft angle gradually increases along the or at least one of the variable-draft-angle Fresnel prisms from the second side to the first side; thus, production of the lens is simplified;
  the surface of the draft facet of the one or more variable-draft-angle Fresnel prisms is continuously derivable; this allows abrupt changes in gradient such as steps to be avoided, thus decreasing the risk of parasitic rays; moreover, production is again simplified;
  for a given axis perpendicular to the optical axis, the draft angles increase from one Fresnel prism to the next along this axis, in a direction extending from the optical axis to the peripheral edge of the lens; over the extent of the lens in this direction, more parasitic rays are collected by the reception zone;
  if the draft angle of minimum value of all the draft angles of the various Fresnel prisms on the second side of the lens and the draft angle of maximum value of all the draft angles of the various Fresnel prisms on the first side of the lens are considered, the angular difference between this minimum value and this maximum value is substantially equal to the thickness of the light beam intended to illuminate the lens;
  the angular difference mentioned in the above paragraph may have a value comprised between 10° and 20°; these values give good results; in this case, the beam intended to illuminate the lens has a thickness comprised between 10° and 20°;
  along the or at least one of the variable-draft-angle Fresnel prisms and from the second side to the first side, the corresponding Fresnel prism comprises at least one spreading segment located laterally with respect to a direction extending from the first side to the second side, and in this spreading segment:
  the draft angle varies more, and/or
  the draft angle decreases then increases again;
  thus, it is possible to spread rays issued from lateral zones of the lens and that exit into the dark zone;
  along a given Fresnel prism, in a plane perpendicular to the optical axis, the angle between the start and end of the spreading segment and the vertex of which is substantially on the optical axis has a value comprised between 15 and 45°, this angle extending on either side of a point located halfway between said first side and said second side;
  the surface of the draft facet of the one or more variable-draft-angle Fresnel prisms is a ruled surface; it is thus simpler to produce;
  the main facet of at least one of the variable-draft-angle Fresnel prisms may comprise thickness modulations that are arranged so as to decrease the chromatic aberration of the lens or to attenuate the clearness of the cutoff of the low beam;

Figure 1:
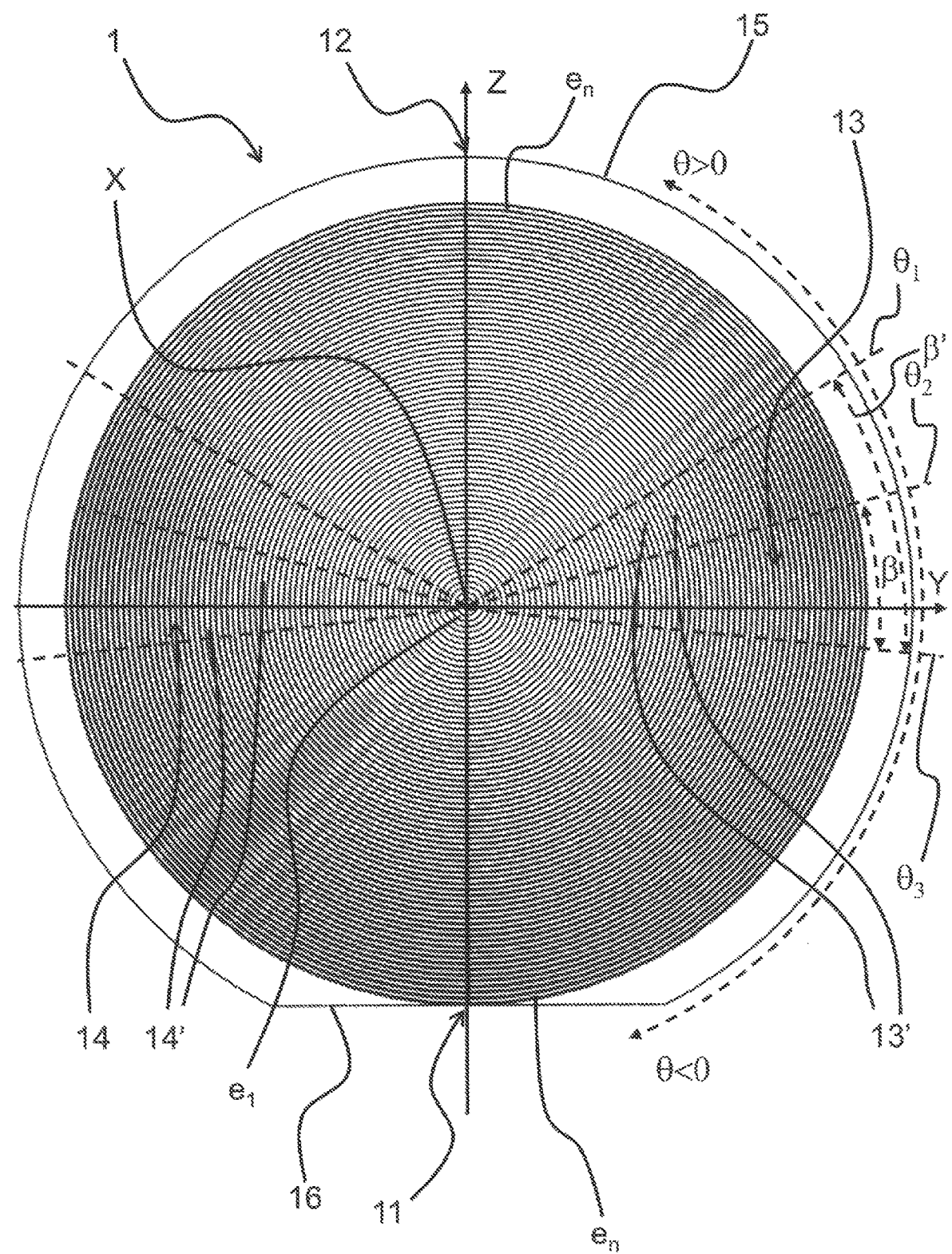

each Fresnel prism has a ridge, the ridges of most of the samples being coplanar; the lens thus has a small bulk thicknesswise; by most of the Fresnel prisms, what is meant is at least half the number of Fresnel prisms that the lens comprises; in particular, the ridges of at least 75%, for example at least 90%, or at least 100%, of these Fresnel prisms may be coplanar;

each Fresnel prism has a ridge, the ridges of most of the Fresnel prisms being concentric, in particular about the optical axis; this allows the Fresnel prisms to be more easily produced continuously around the optical axis; in particular, the ridges of at least 75%, for example at least 90%, or even 100%, of the Fresnel prisms are concentric;

the first facets of the Fresnel prisms together form the equivalent of a convergent dioptric interface having a focal point upstream of the lens.

Another subject of the invention is a lighting module comprising:

a lens according to the invention, and an element for positioning a light source, said element being intended to hold the light source in a given position with respect to the lens, the lighting module being arranged so as to form, by means of at least the first facets of the Fresnel prisms of the lens, a light beam with a cutoff line separating a light zone of the beam from a dark zone, when a light source is placed in the given position.

The lens may thus be used to form a cutoff-containing lighting beam, for example a low beam.

The lighting module according to the invention may optionally comprise one or more of the following features:

the lens may be arranged so that the first side is located, with respect to the optical axis, on the same side as the light zone; thus, the rays are not deviated by the draft facets toward the dark zone but toward the light zone increasing its luminosity;

in the case where the lens comprises spreading segments, the latter may be arranged so that the rays deviated by the draft facets in these spreading segments are deviated toward the dark zone;

the first facets of the Fresnel prisms together form the equivalent of a convergent dioptric interface having a focal point upstream of the lens, the lighting module comprising a shield that is arranged, with respect to the lens and to the position of the light source, to form the cutoff line;

the shield is horizontal when the lens is vertical, the first side then being located at a level located essentially below a plane in which, on the whole, the upper surface of the shield lies; thus, the rays are not deviated by the draft facets toward the dark zone but toward the light zone increasing its luminosity; the upper surface of the shield may be reflective.

Another subject of the invention is a lighting device comprising a lighting module according to the invention, in particular a vehicle headlamp.

Another subject of the invention is a vehicle comprising a lighting device according to the invention, said device in particular being connected to the electrical supply of the vehicle.

Unless otherwise indicated, the terms "front", "behind", "lower", "upper", "side", and "transverse" refer to the orientation that the lens and the lighting module are intended to have in the lighting device and with respect to the direction of emission of the light out of the lighting device.

The terms "upstream" and "downstream" refer to the direction of propagation of the light.

Figure 2:
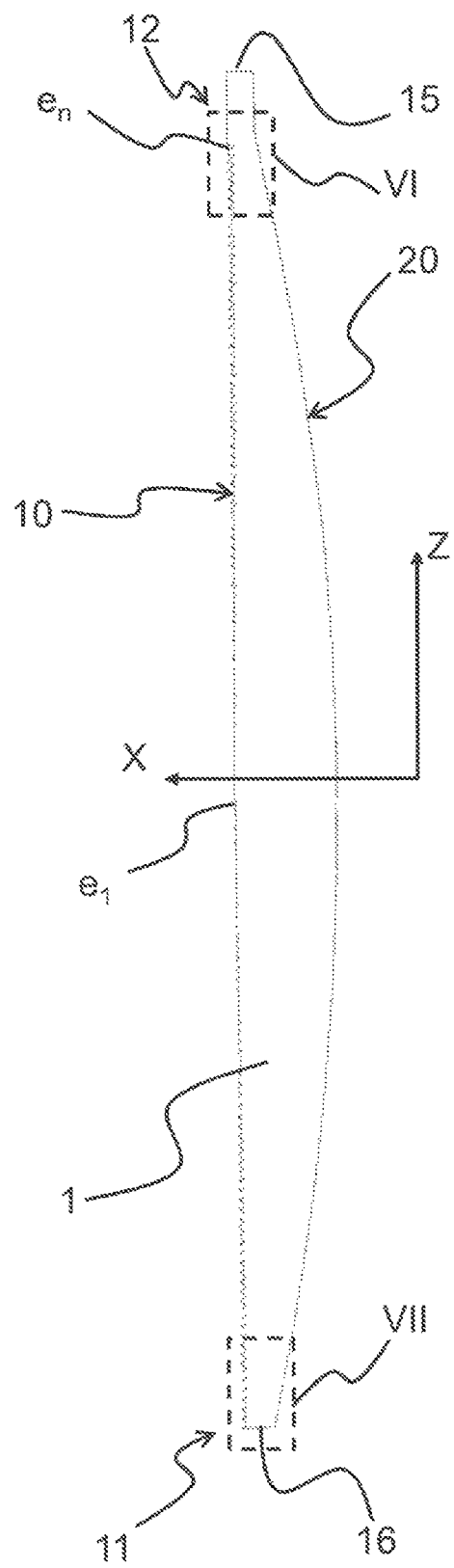
Figure 3:
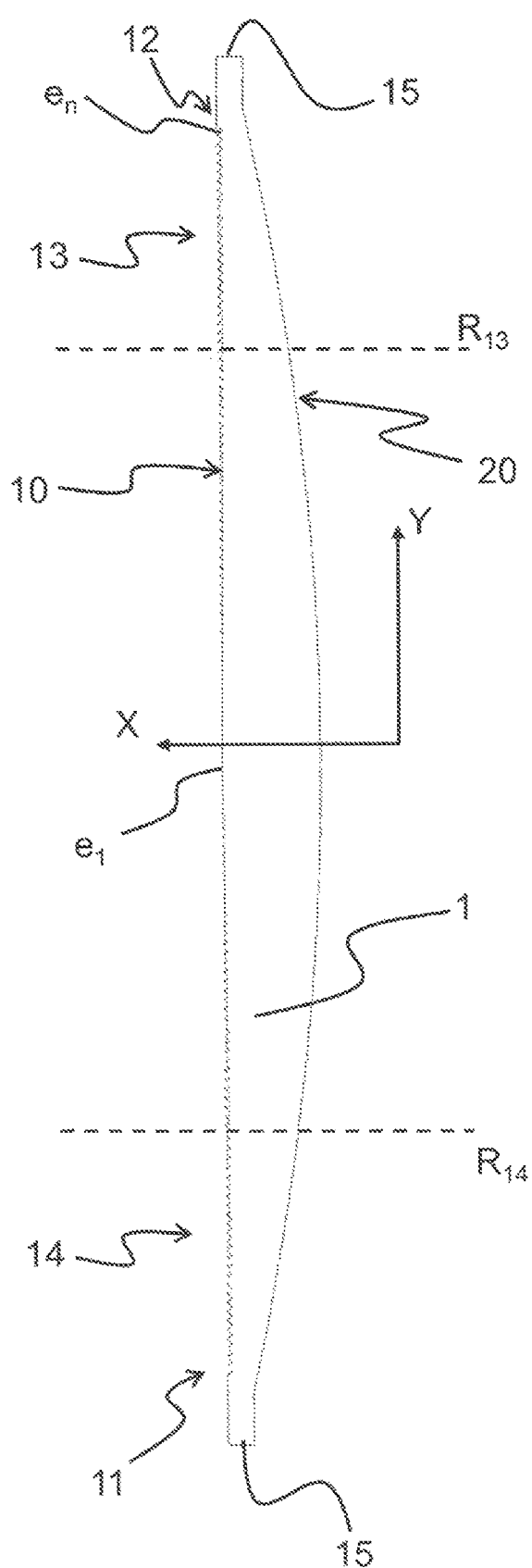
Figure 4:
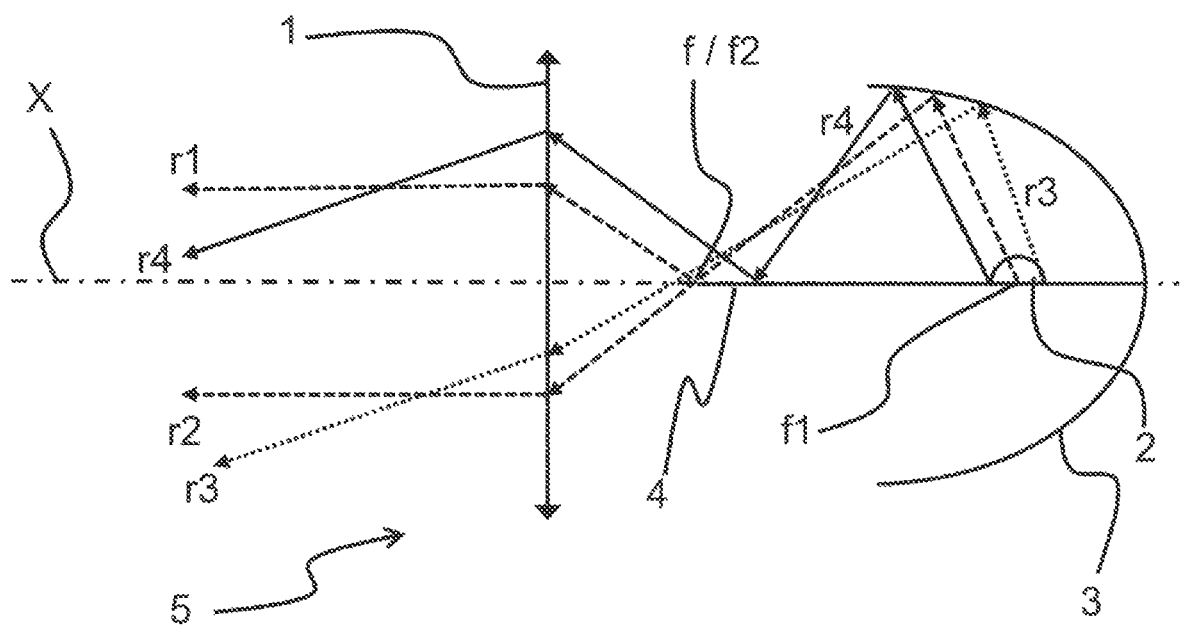
Figure 5:
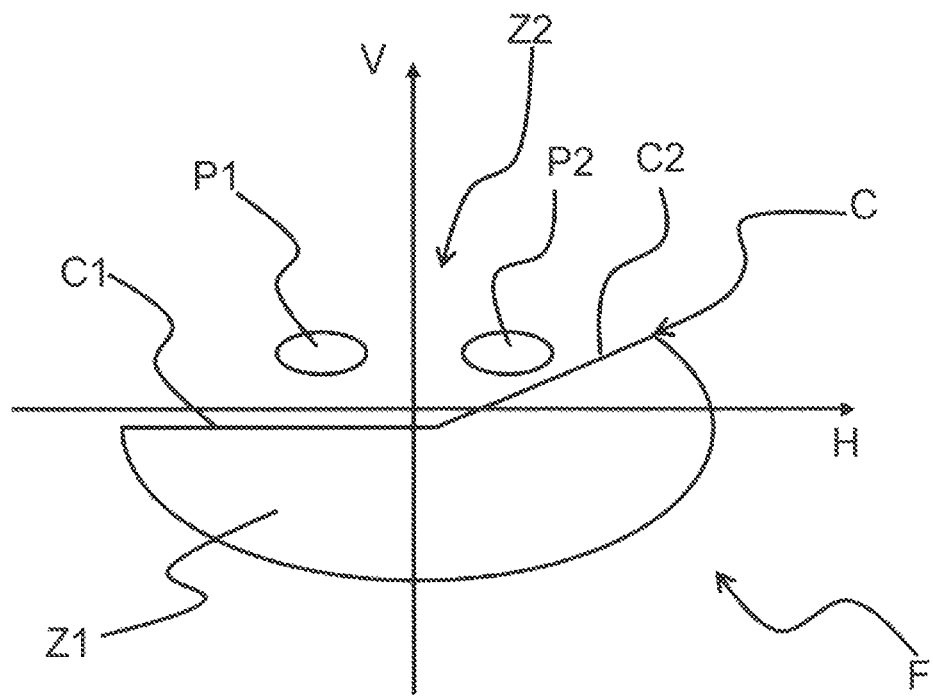
Figure 6:
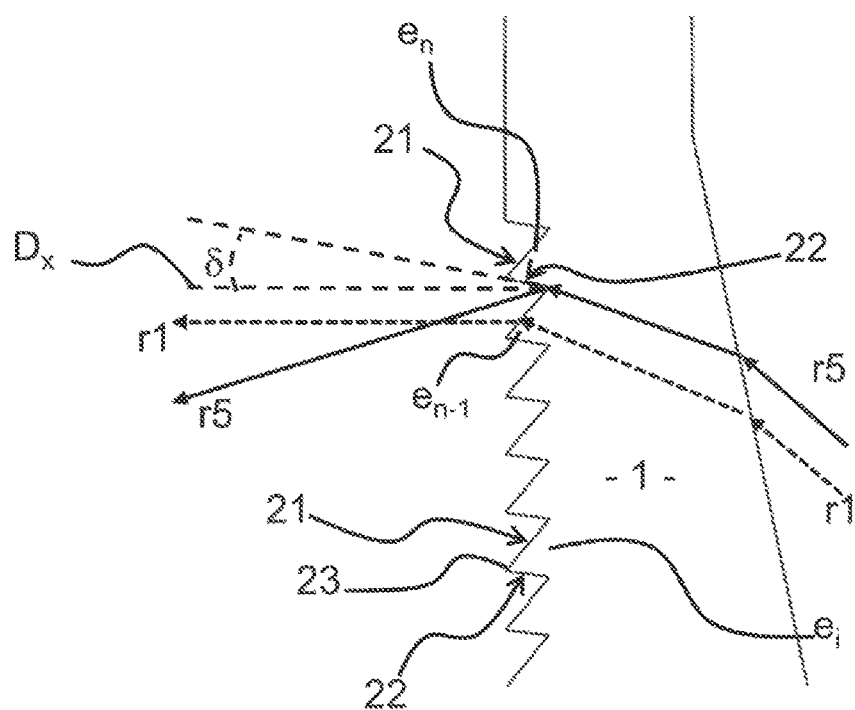
Figure 7:
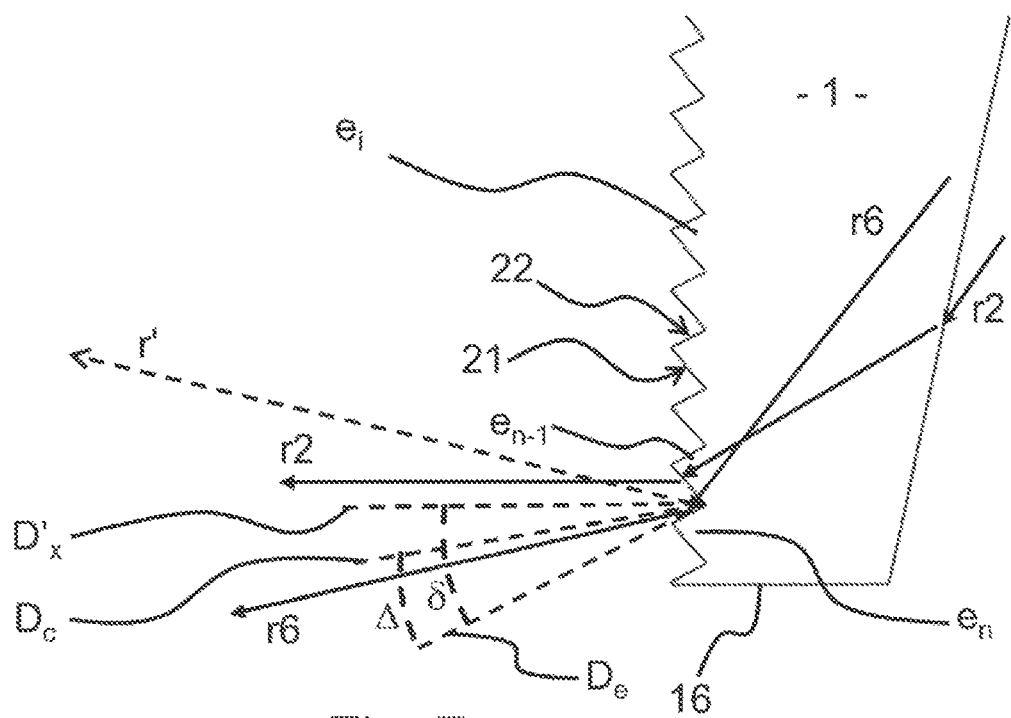

Other features and advantages of the invention will become apparent on reading the detailed description of the following nonlimiting examples, which description will be better understood with reference to the appended drawings, in which:

FIG. 1 is a front-on view of a lens according to one embodiment of the invention;

FIGS. 2 and 3 are cross sections of FIG. 1 cut in planes perpendicular to the axis Y and to the axis Z, respectively;

FIG. 4 is a schematic showing a lighting module according to the invention equipped with the lens of FIG. 1;

FIG. 5 is a schematic of a light beam obtained by means of the lighting module of FIG. 4;

FIGS. 6 and 7 are enlargements of zone VI and of zone VII in FIG. 2, respectively;

FIG. 8 is a table of some values of the draft angle as a function of the positioning angle θ for a given Fresnel prism $e_i$.

DETAILED DESCRIPTION OF THE PREFERRED EMBODIMENTS

FIG. 1 illustrates an example of a Fresnel lens 1 according to the invention and face-on.

The lens 1 has an optical axis X.

According to the invention, as here, the lens 1 may be intended to be positioned in a vehicle so that this optical axis X is parallel to the longitudinal axis of the vehicle.

The axis Z and axis Y here correspond to the vertical and transverse orientations, respectively. The lens 1 is here oriented in the position that it is intended to have in the vehicle.

FIG. 2 is a cross section of the lens 1 cut in a vertical longitudinal plane that therefore contains the axes X and Z. FIG. 3 is a cross section of the lens 1 cut in a horizontal longitudinal plane that therefore contains the axes X and Y.

The lens 1 has an entrance face 20 and an exit face 10. The entrance face 20 is intended to receive light rays originating, indirectly in this example, from a light source. The light rays then propagate through the lens 1 to the exit face 10, via which they exit, thus forming a lighting beam.

The lens 1 comprises a plurality of Fresnel prisms $e_i$ the surface of which forms most of the exit face 10. In this example, the Fresnel prisms $e_i$ are arranged concentrically about the optical axis X and about a convex central segment.

The number of Fresnel prisms is "n". The first Fresnel prism is referenced $e_1$ and is arranged around the convex central segment, which for its part is here centred on the optical axis X.

The last Fresnel prism is referenced $e_n$ and is therefore the Fresnel prism the furthest from the centre, namely that closest to the peripheral edge 15 of the lens 1.

The number of Fresnel prisms may be variable. The more the lens 1 must be convex and thin, the higher this number must be. In this example, the number of Fresnel prisms is 72 but this number is nonlimiting.

The lens 1 has a first side located at the bottom, referred to below as the bottom side 11, and a second side located at the top, referred to below as the top side 12.

To specify the position on a given Fresnel prism $e_i$, its angular coordinate, namely the angle that the direction passing through the centre of the lens 1 and the given position makes to the transverse axis Y, is here used. This angle is called the positioning angle δ below. The positioning angle θ therefore has a value of 0° on the transverse axis Y, of 90° on the vertical axis Z and above the transverse axis Y, and of −90° on the vertical axis Z and below the transverse axis Y. The positioning angle θ is therefore positive above the transverse axis Y, and negative below.

The lens 1 has two lateral singular segments 13, 14 that are located on the left and on the right of the lens, and therefore on the right and on the left in FIG. 1. In FIG. 1, only the angular limits, the dashed lines located in positions $\theta_1$ and $\theta_3$, of these lateral singular segments have been shown.

In this example, these lateral singular segments 13, 14 do not cover all the Fresnel prisms of the lens 1 and therefore also have radial limits $R_{13}$ and $R_{14}$, which are solely illustrated in FIG. 3 for greater clarity.

In these lateral singular segments 13, 14, and the corresponding segment of each of the Fresnel prisms is what is called a spreading segment 13', 14'. The spreading segments 13', 14' of these Fresnel prisms are therefore also each arranged on either side of the transverse axis Y, between the dashed straight lines in FIG. 1. Each of these spreading segments 13', 14' has an angular extent IP between the start of the corresponding spreading segment 13', 14', at the position $\theta_1$, and the end of the spreading segment 13', at the position $\theta_3$. The particularity of these spreading segments 13', 14' will be described below.

It will be noted that, according to the invention, the lens 1 may have a poka-yoke allowing the lens 1 to be correctly positioned and oriented in the lighting module intended to receive it.

For example, here the poka-yoke is a flat 16 arranged at the bottom of the lens and the surface of which is perpendicular to the vertical axis Z. Thus, when the latter is horizontal, the lens 1 is correctly oriented.

FIGS. 6 and 7 show enlargements of the top 12 and bottom 11 sides, respectively.

As may be seen in these figures, each Fresnel prism $e_i$ has a first facet, called the main facet 21, and a second facet, called the draft facet 22. The draft facet 22 makes a draft angle δ to the optical axis, as may be seen in these figures, in which a direction $D_x$, $D'_x$ parallel to the optical axis X and passing through the base of one of the draft facets 22 has been shown.

According to the invention, for at least one of the Fresnel prisms, referred to as the variable-draft-angle Fresnel prism $e_i$, the draft angle δ is variable along this variable-draft-angle Fresnel prism $e_i$, so that this draft angle δ is higher on a first side of the lens, here the bottom side 11, than on a second side of the lens that is opposite the first side, here the top side 12.

This variation is shown in FIGS. 6 and 7 for the last Fresnel prism $e_n$, which is therefore a variable-draft-angle Fresnel prism.

In FIG. 7, the theoretical direction $D_c$ corresponds to the direction, and therefore to the orientation, that the draft facet 22 of this last Fresnel prism $e_n$ would have had in the cross-sectional plane of FIG. 7 if the draft angle δ were constant. The direction $D_e$ shows the actual direction $D_e$ of the draft facet $e_n$ of this last Fresnel prism in the cross-sectional plane of FIG. 7. As may be seen in FIG. 7, the theoretical direction $D_c$ is offset less from the optical axis X than the real direction $D_e$. A non-negligible angular difference Δ between the actual value of the draft angle δ at the bottom of the lens 1 and the value that this angle would have if its value were identical to its value at the top of the lens 1 may be seen in FIG. 6. In this example, this angular difference Δ is about 18°. The effect on the light rays r1, r2, r5 and r6 and the hypothetical path r' are described below.

In this example, all the Fresnel prisms $e_i$ are variable-draft-angle Fresnel prisms.

The draft angle δ varies gradually along each Fresnel prism $e_i$, from the top side 12 to the bottom side 11. This variation is called the circumferential variation.

Here, for each of the Fresnel prisms $e_i$ located in the segment extending from the first included Fresnel prism $e_1$ to the Fresnel prism adjacent to the radial limit $R_{13}$, $R_{14}$ of each lateral singular segment 13, 14, the circumferential variation is a gradual increase.

Here, for each of the Fresnel prisms $e_i$ located in the segment extending from the Fresnel prism adjacent to the radial limit $R_{13}$, $R_{14}$ of each lateral singular segment 13, 14 to the last Fresnel prism $e_n$, the circumferential variation is a gradual increase along the corresponding Fresnel prism, from the top side 12 to the start of the spreading portion 13', 14', at $\theta_1$, then an abrupt increase to the value $\theta_2$, then is a gradual decrease to the end of the spreading segment 13', 14', at $\theta_3$, in order then to once again gradually increase to the bottom side 11.

Here, it may also be seen, for a given axis perpendicular to the optical axis X, for example the axis Y or the axis Z, that the draft angles δ increase from one Fresnel prism $e_i$ to the next along this axis, in a direction extending from the optical axis X to the peripheral edge 15 of the lens 1. This variation is called the radial variation.

The table of FIG. 8 illustrates these circumferential variations in draft angle δ, which are continuous along a given Fresnel prism, and the radial variations of the draft angle δ. This table indicates the draft angle δ for a Fresnel prism $e_i$ of given number i, which is indicated on the first line, and for a given direction, indicated in the first column by the positioning angle θ.

In this example, the surface of the draft facet 22 of the Fresnel prisms $e_i$ is continuously derivable and is a ruled surface.

It will be noted here that the lateral singular segments 13, 14, and therefore the spreading segments 13', 14' of the Fresnel prisms passing through the latter, here have an angular extent β' of about 45°, starting at least at a positioning angle of value $\theta_1$ of about 40° and ending at a positioning angle of value $\theta_3$ of about −5°. The draft angle δ decreases from the value $\theta_2$ of about 15°. The segment in which the circumferential variation is a decrease therefore has an angular extent β of about 20°.

Each Fresnel prism $e_i$ has a ridge 23. In this example, the ridges 23 of the Fresnel prisons are coplanar and concentric.

In this example, these ridges 23 are circular and centred on the optical axis X. The pitch between each ridge 23 is constant, and here 0.5 millimetres. Each Fresnel prism is therefore separated by a recess; the location of the recess forms a curve the radius of curvature of which is not constant, because of the variation in the draft angle δ.

Seen face-on, as in FIG. 1, the concentric lines correspond to the draft facets seen in projection. The main facets 21 between these lines are therefore essentially observed. These main facets 21 together form the active dioptric interface of the Fresnel lens 1.

Thus, the lens 1 forms a convergent lens of focal point f.

This lens 1 is intended to be optically coupled to an elliptical reflector 3, as illustrated in FIG. 4, in order to form a lighting module 5 according to the invention.

Conventionally, a light source 2, such as a light-emitting diode, is placed at a first focal point f1 of the reflector 3.

Here, the optical axes X of the lens 1 of the reflector 3 are coaxial.

A shield 4 is arranged horizontally and behind the focal point f of the lens. The front edge of the shield 4 is arranged at the focal point f of the lens 1. This shield prevents rays from passing under the focal point f of the lens 1.

Here, the upper face of the shield 4 extends horizontally and comprises the optical axis of the lens.

As here, this upper face may be reflective.

The focal point f of the lens 1 is placed on the second focal point f2 of the reflector 3. Thus, the light rays r1, r2 that the light source 2 emits and that start from the first focal point f1 of the reflector 3, pass through the focal point f of the lens 1 and are then deviated by the latter, so that they exit therefrom parallel to the optical axis.

Because the light source 2 is not mathematically point-like, certain rays r3, r4 will be emitted slightly away from the focal point f1.

Rays r3 emitted behind the focal point f1 will be reflected downward and will pass above the focal point f1 of the lens 1, which will bend them downwards.

Rays r4 emitted in front of the focal point f1 are reflected by the reflector downward and behind the second focal point f2 of the reflector 3. They are then reflected toward the top of the lens 1 by the shield 4. They therefore also pass above the focal point f1 of the lens 1, which bends them downward.

More particularly, in the context of this Fresnel lens, as may be seen in FIG. 4 and/or in FIGS. 6 and 7, the rays passing through the main faces 21 are either oriented in a direction parallel to the optical axis X of the lens 1, when these rays r1, r2 originate from the first focal point f1 of the reflector, or are oriented downward when these rays r4, r3 are emitted slightly in front or behind the first focal point f1 of the reflector 3.

Thus, the highest direction of the rays exiting the lighting module is the direction of the rays r1, r2 passing through the focal point f of the lens 1.

Thus, a lighting beam F, illustrated in FIG. 5, having an upper cutoff C delineating a dark zone Z2 from a light zone Z1 of the beam F is formed.

In this example, it is a question of a low beam, the cutoff line C of which therefore has a horizontal portion C1 on the side of oncoming traffic and an oblique portion C2 on the side on which the vehicle is being driven. Thus, drivers of oncoming vehicles or of vehicles that are being followed are not dazzled and the bottom-side located on the side on which the vehicle equipped with the lens 1 is being driven is lit.

The circumvention variation in the draft angle δ according to the invention here makes it possible to prevent rays r5, r6 from being directed into the dark zone Z2 and to the horizon line H, where they could dazzle other drivers.

Specifically, as may be seen in FIG. 6, on the top side of the lens 1 the draft angle δ is arranged so that, for a given draft facet, rays emitted in the direction of the corresponding Fresnel prism and of the Fresnel prism therebelow pass above or below the draft facet, and therefore do not strike this draft facet. In FIG. 6, the ray r5 is a limit ray that strikes the main facet 21 of the Fresnel prism $e_{n-1}$ right at the top of this main facet 21. The draft angle δ is such that rays passing above this ray r5 pass above the draft facet of the Fresnel prism $e_n$ located above, and thus strike the main facet 21 of the latter. The rays therefore do not encounter the draft facets before they are refracted by the main facets 21. They are therefore all refracted forward and downward and therefore also do not encounter the draft facet after refraction. Therefore none of the rays encounter a draft facet, and therefore the risk of parasitic rays being generated in the upper portion of the lens 1 is significantly decreased.

On the bottom side of the lens, certain rays r6 refracted by the main facet 21, namely those closest the bottom of a groove separating two Fresnel prisms, here $e_n$ and $e_{n-1}$, encounter draft facets 22 after refraction downward. They are then reflected by the draft facet 22 because of their angle of incidence. However, these rays r6 are bent less towards the optical axis X than they would be with a constant draft angle. Specifically, instead of being reflected upward by the draft facet 22, these rays r6 remain directed downward, because the draft angle δ to the optical axis X is larger compared to the draft angle for the same Fresnel prism $e_n$ at the top of the lens. The hypothetical path r' that the ray r6 would take after reflection if the draft angle δ were constant may be seen in FIG. 7. Since this hypothetical path is directed upward, the reflected ray could cause dazzle if it were to follow it.

Thus, at the bottom of the lens, even rays that strike the draft facets 22 are thus directed into the light zone Z1 of the beam F, in which zone they will not cause dazzle.

It will be noted that the bottom side 11 is thus located, with respect to the optical axis X, on the same side as the light zone Z1 of the beam F.

In the spreading segments 13', 14', the draft angles δ allow rays that strike the draft facets 22 to be redirected above and away from the cutoff line C, thereby deviating them into the dark zones Z2, in particular in such a way that they do not cause dazzle. Moreover, this allows, without however causing dazzle, luminosity to be increased in the zones above the road that are referred to as gantry-point zones P1, P2, which are liable to contain signs on gantries, in particular over-road gantries.

For example, this deviation may be such that the luminosity values in the dark zone Z2 are lower than a regulatory maximum luminosity for the dark zone Z2 of a cutoff-containing beam, such as a low beam, but higher than a regulatory minimum luminosity in the gantry-point zones P1, P2.

The main facets 21 may comprise thickness modulations (not shown) arranged so as to decrease the chromatic aberration of the lens. Alternatively or in addition, the main facets 21 may comprise thickness modulations (not shown) arranged so as to improve or to attenuate the clearness of the cutoff of the low beam.

What is claimed is:

1. A Fresnel lens having an optical axis and comprising Fresnel prisms, each Fresnel prism having a first refracting facet, called the main facet, and a second reflecting facet, called the draft facet, the draft facet making a draft angle with respect to the optical axis, wherein for at least one of the Fresnel prisms, referred to as the variable-draft-angle Fresnel prism, the draft angle is variable, so that the draft angle is higher on a first side of the Fresnel lens than on a second side of the Fresnel lens that is substantially opposite the first side, wherein along the at least one of the variable-draft-angle Fresnel prisms and from the second side to the first side, the at least one of the variable-draft-angle Fresnel prisms comprises at least one spreading segment located laterally with respect to a direction transverse to the optical axis, and extending from the first side to the second side, and in the spreading segment, the draft angle gradually increases from the top of the second side to a start of the spreading segment, then gradually decreases to an end of the spreading segment, and then gradually increases to the bottom of the first side.

2. The Fresnel lens according to claim 1, wherein the angle between the start and end of the spreading segment and the vertex of which is substantially on the optical axis has a value between 15° and 45°, the angle extending on either side of a point located halfway between the first side and the second side.

3. The Fresnel lens according to claim 1, wherein
the Fresnel lens is oriented, in a vehicle, with the first side at the bottom of the Fresnel lens and the second side at the top of the Fresnel lens.

* * * * *